(12) United States Patent
Irvine et al.

(10) Patent No.: US 8,748,052 B2
(45) Date of Patent: Jun. 10, 2014

(54) REVERSIBLE FUEL CELL

(75) Inventors: John Thomas Sirr Irvine, Fife (GB); Julie Margaret Nairn, Fife (GB); Paul Alexander Conner, Fife (GB); James Rennie, Fife (GB); Alan Feighery, Fife (GB); Frances Gwyneth Elaine Jones, Manchester (GB); Kelcey Lynn Eccleston, Oxford, OH (US); Pierrot Sassou Attidekou, Fife (GB)

(73) Assignee: The University Court of the University of St. Andrews, St. Andrews (GB)

( * ) Notice: Subject to any disclaimer, the term of this patent is extended or adjusted under 35 U.S.C. 154(b) by 576 days.

(21) Appl. No.: 12/160,838

(22) PCT Filed: Feb. 7, 2007

(86) PCT No.: PCT/GB2007/000409
§ 371 (c)(1),
(2), (4) Date: Jul. 14, 2008

(87) PCT Pub. No.: WO2007/091050
PCT Pub. Date: Aug. 16, 2007

(65) Prior Publication Data
US 2010/0167147 A1 Jul. 1, 2010

(30) Foreign Application Priority Data

Feb. 7, 2006 (GB) .................... 0602406.1

(51) Int. Cl.
*H01M 8/00* (2006.01)
*H01M 8/02* (2006.01)
*H01M 8/04* (2006.01)
*H01M 8/06* (2006.01)
*H01M 8/10* (2006.01)
*H01M 8/12* (2006.01)
*H01M 8/18* (2006.01)
*H01M 8/22* (2006.01)

(52) U.S. Cl.
USPC ........... 429/434; 429/439; 429/440; 429/497; 429/488; 429/505; 429/495; 429/515; 429/408; 429/535

(58) Field of Classification Search
USPC ............... 429/21, 17, 32, 434, 512, 495, 497, 429/418, 439, 440, 488, 505, 515, 535, 408
See application file for complete search history.

(56) References Cited

U.S. PATENT DOCUMENTS 3,466,196 A * 9/1969 Gosmand ...................... 429/433
5,306,577 A 4/1994 Sprouse
2005/0053812 A1 * 3/2005 Hickey et al. .................. 429/21

FOREIGN PATENT DOCUMENTS

EP 1 464 622 A 10/2004
WO WO 97/10969 A 3/1997

OTHER PUBLICATIONS

"Catalyst Mobility in Regenerative Fuel Cell Systems", Edward W. Miller, Masters Thesis, University of Houston, Aug. 2000.*
"Hydrogen-Oxygen PEM Regenerative Fuel Cell Energy Storage System", Bents, David J. et al., NASA Glenn Research Center, Cleveland, OH, NASA/TM-2005-213381, Jan. 2005.*

(Continued)

*Primary Examiner* — Kenneth Douyette

(57) ABSTRACT

An electricity storage system comprising a reversible fuel cell having a first electrode and a second electrode separated by an ionically conducting electrolyte, and at least two chambers adapted to hold fuel and/or a reaction product, wherein the system is substantially closed and at least one reactant for discharge is hydrogen or oxygen.

22 Claims, 5 Drawing Sheets

(56) References Cited

OTHER PUBLICATIONS

International Search Report for corresponding PCT/GB2007/000409 completed Jun. 21, 2007 by Tiziana Pipoli of the EPO.
Milliken C.E. et al.: "*Low Cost, High Efficiency Reversible Fuel Cell Systems*"; Proceedings of the 2002 US DOE Hydrogen Program Review NREL/CP-610-32405, [Online] Apr. 20, 2004, XP002437065 Retrieved from the internet: URL:http://web.archive.org.web/20040420095326/http://www.eere.energy.gov/hydrogenandfuelcells/pdfs/32405b25.pdf.

* cited by examiner

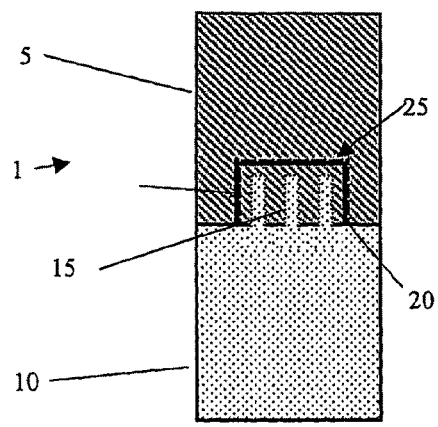
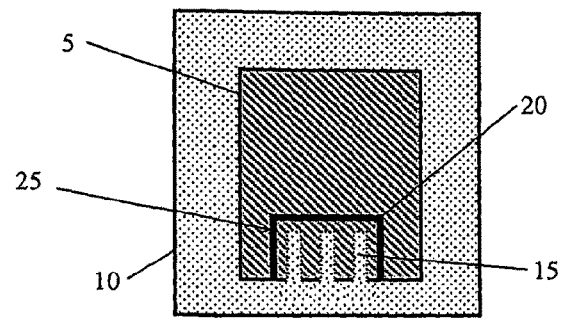
Figure 2
Figure 1
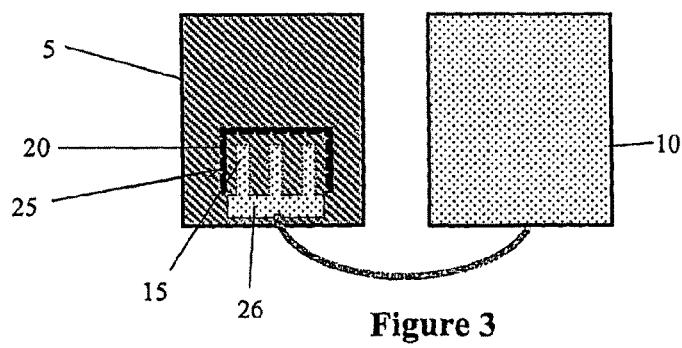
Figure 3

US 8,748,052 B2

REVERSIBLE FUEL CELL

FIELD OF THE INVENTION

The present invention relates to a fuel cell and in particular a reversible fuel cell.

BACKGROUND TO THE INVENTION

A combination of unpredictable oil prices, global warming and an ageing, often ill-planned, electricity grid system in countries such as the USA and UK places many demands on electricity generation and distribution. A particular problem is that of how to ensure supply meets demand. This is because electricity networks often have little or no electricity storage capacity. Hence, the demand at any time must be forecast and generation resources brought on and off line accordingly. This results in the need for extra generation capacity in the system, so called spinning reserve.

There are a few options currently available for large-scale storage of electricity, for example pumped hydro schemes. These generally involve construction of a dam and reservoir at altitude with a hydro generating facility at a lower altitude. During times of low demand, electricity is taken from the grid and used to pump water up into the reservoir, which is then released to turn turbines during time of peak demand. However, these systems require certain geological features that limit the scope for their application. In addition, there can be adverse environmental impact such as flooding of land.

Another storage solution uses battery arrays. These are generally suited as small scale localised back up, such as for uninterrupted power supplies (UPS) for key installations or delicate equipment such as hospitals or computer servers. Large arrays of nickel metal hydride (NiMH) batteries have been used for grid backup for isolated communities, such as that recently trialled in Fairbanks, Ak. However, these are expensive to install, require the maintenance and monitoring of many cells, and generate significant amounts of low-grade heat that is difficult to utilise. They can also suffer from self-discharge and have a limited cycle life.

A further option is to use flow cells, often called redox batteries. These use the constant circulation of two electrolytes, each containing one half of a reversible redox couple through electrical cells. Electricity may be stored by driving a current through the cells in order to electrochemically reduce one electrolyte whilst oxidising the other. When current is required, the applied current is removed and the reduction/oxidation process reverses to provide a current. Whilst these provide an efficient and flexible large-scale power storage solution, they have some significant disadvantages. For example, some use hazardous materials requiring extensive and expensive safety systems. Also, some suffer from a low energy density due to poor solubility of the reactive components, mass transport effects due to the active materials being in solution and problems due to self-discharge caused by active material crossing the cell membranes.

Another storage solution uses fuel cells, which electrochemically react two fuel materials that are continuously supplied to the cell in order to generate electricity. There are many possible electroactive couples that may be used in fuel cells such as ethanol/oxygen and methane/oxygen. The most environmentally attractive is the hydrogen/oxygen cell. This utilises the electrochemical reaction of hydrogen and oxygen to produce water with heat as a by-product. Advantageously, all the products produced are usable and generally environmentally benign.

Although some of the reactants used in fuel cells, such as oxygen, may be extracted from the atmosphere, others, such as hydrogen, need to be produced. This may be done on site or off site with the hydrogen being transported to its location of use, often in liquefied form. One common method of hydrogen production is electrolysis of water, which generally involves passing a current between catalytically active electrodes in order to split it into hydrogen and oxygen. The hydrogen is dried and compressed into storage tanks. When needed, the hydrogen is passed to the fuel cell where it is electrochemically reacted with oxygen from air to give electricity. This is, however, a reasonably complex arrangement, as it needs a pure water source, an electrolyser, compressors, driers, storage tanks, fuel cell and its ancillaries, and enough sensors and control gear to integrate the system.

SUMMARY OF INVENTION

According to the present invention, there is provided an electricity storage system comprising a reversible fuel cell having a first electrode and a second electrode separated by an ionically conducting electrolyte, and at least two chambers adapted to hold fuel and/or a reaction product, each chamber being in passive communication with the fuel cell, wherein the system is substantially closed. Preferably, the fuel is hydrogen and oxygen.

By using a closed, reversible fuel cell configuration, there is provided a safe, passive and highly effective means for storing and generating electricity.

Preferably, at least one of the chambers is a high pressure gas chamber.

The cell may be a solid oxide fuel cell. The cell may be tubular. The electrolyte may be yttrium stabilized zirconia. The cell may be produced using a tape casting method.

The system may include a cooler for removing heat. Preferably, this is connected to some external system, for example, a heating system so that heat removed by the cooler can be re-used elsewhere.

One of the chambers may be mounted within the other chamber.

One or more of the chambers may be remote from or external to the cell.

DESCRIPTION OF THE DRAWINGS

Various aspects of the invention will now be described by way of example only and with reference to the accompanying drawings of which:

FIG. 1 is a schematic of a first reversible fuel cell system;

FIG. 2 is a schematic of a second reversible fuel cell system;

FIG. 3 is a schematic of a third reversible fuel cell system;

SPECIFIC DESCRIPTION

Figure 4:
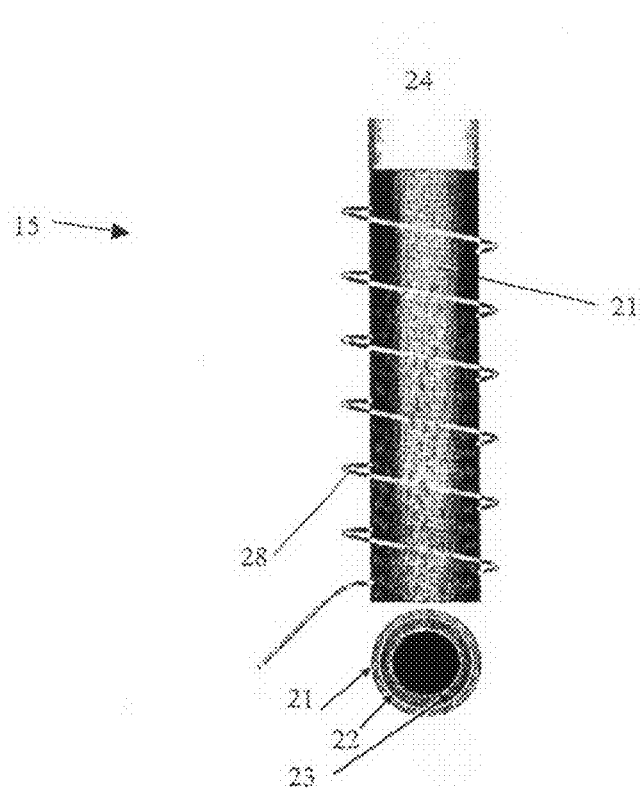
FIG. 4 is a schematic of a cell for use in any of the fuel cell systems of FIGS. 1 to 3.

FIG. 1 shows reversible electricity and heat generation and storage apparatus 1 having two high-pressure gas storage vessels 5, 10 separated by at least one reversible fuel cell 15. Water in the form of steam and hydrogen is stored in one storage vessel 5. Pure oxygen is stored in the other vessel 10. One vessel 5 or 10, preferably the storage vessel in which water is formed, is adapted to receive the fuel cells 15. The contact between the two vessels 5 and 10 is via the reversible fuel cell 15. The materials of the fuel cell are selected such that only oxide ions can move through the cell 15 and into another vessel. The apparatus 1 is arranged to allow reversible operation as a closed system and operate without a continuous supply and flow of fuel products through the system. The apparatus 1 is arranged so that the same cell(s) 15 are used for both charge and discharge reactions.

The reversible fuel cells 15 are solid oxide fuel cells (SOFC). As shown in FIGS. 1 and 4, the fuel cell(s) 15 are tubular, which allows for strong cells that are resistant to high pressures. They are also easy to seal, easy to produce and provide a large active surface area without forced flow. The cells 5 may be produced using a variation of the tape casting process described in WO2003036746, the contents of which are incorporated herein by reference. This involves the preparation of three layers, these being the hydrogen electrode 21, the electrolyte 22 and the oxygen electrode 23. The layers are rolled into tubular concentric spirals around a single former to form a central cavity. The oxygen electrode material is arranged to face the central cavity of the cell, whilst the hydrogen electrode material is arranged to face the outside of the cell.

Various materials may be used to produce the electrodes and electrolyte, as is known in the art. In one example, the electrode facing the hydrogen/steam tank is a nickel/yttrium stabilized zirconia (Ni/YSZ) electrode, the electrolyte is YSZ and the electrode facing the oxygen containing tank is a lanthanum strontium magnetite (LSM)/YSZ electrode. The tubular cell may be sealed at one end, for example using a YSZ seal 24. The opposing end of each tubular cell 15 is sealed onto the end of a steel tube using a glass seal. The cell 15 and steel tube are mounted to a gas supply manifold 26 and wired together using copper. Thus, the electrical connections for the oxygen-facing electrode are via the steel tube connectors and the electrical connections for the hydrogen-facing electrode are via nickel or copper wire 28 wrapped around or otherwise attached to the hydrogen-facing electrode of the cell 15. The gas supply manifold allows oxygen to enter the internal cavity of the cell 15 from the oxygen tank 10. The cell is placed in the hydrogen tank 10, such that the hydrogen contacts the hydrogen facing electrode on the outside of the cell.

The hydrogen tank 5 is a steel pressure vessel. In the embodiment of FIG. 1, a single vessel with a separating wall defines the individual tanks 5 and 10. The fuel cells 15 are incorporated into the separating wall. In alternate embodiments, the hydrogen tank 5 may be contained within the oxygen tank 10 in order to improve the insulation, as shown in FIG. 2. A further embodiment is shown in FIG. 3. In this case, the oxygen tank is remote from the hydrogen tank 5 and fuel cells 15 and connected via a pipe or conduit. In all cases, the fuel cells 15 are contained within the hydrogen tank 5 and surrounded by thermally insulating material 20 and a heat regulator 25 in order to allow them to reach and remain at their optimum operating temperatures and to ensure any water is in the form of steam.

The heat regulator 25 may contain a conventional wire wound electrical heating element, conduits for circulation of heating and/or cooling material or any other heating and/or cooling means as is known in the art. As the optimum operating temperature for SOFC systems is of the order of 800° C., the heating element may be used to initially bring the system up to operating temperature. Once operational, the system generates a considerable amount of heat, especially in the fuel cell mode. This excess heat may be extracted by the cooling circuit and used to provide heat for secondary use such as secondary electrical generation, space heating or provision of hot water. The excess heat must be controlled to be less than a maximum operational temperature for tanks 5 and 10.

During discharge, oxygen is reduced at the oxygen facing electrode (the cathode during discharge) to produce oxide ions which are then transported via the electrolyte to the hydrogen facing electrode (the anode during discharge) whereupon hydrogen is oxidised to form water in the form of steam, according to the following equations:

$$H_2(g) + O^{2-}(i) \leftrightarrow H_2O(g) + 2e^- \text{(Anode)}$$

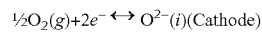
$$\tfrac{1}{2}O_2(g) + 2e^- \leftrightarrow O^{2-}(i)\text{(Cathode)}$$

The reverse reactions occur during recharge, with steam being reduced to form hydrogen and oxide ions. The oxide ions are transported across the electrolyte to the oxygen facing electrode (the anode during charge), where they are oxidised to form oxygen.

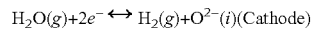
$$H_2O(g) + 2e^- \leftrightarrow H_2(g) + O^{2-}(i)\text{(Cathode)}$$

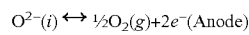
$$O^{2-}(i) \leftrightarrow \tfrac{1}{2}O_2(g) + 2e^- \text{(Anode)}$$

Once filled, the system is run as a closed system and is entirely passive, with only natural processes giving the required mass transfer. This is in contrast to conventional fuel cells, where pumps or highly pressured fuel sources are used to constantly actively supply fresh reactants to the electrodes of the cell and product continuously removed.

The two different sides of the reaction have differing mass transport mechanisms. As the electrolyte in a SOFC system conducts oxide ions, the oxygen tank will always only hold oxygen. Thus, regardless of the state of charge, the concentration of oxygen at the electrode will always be 100% and so mass transport issues at this electrode should not occur. The oxygen within the oxygen tank 10 may be consumed during discharge or generated during recharge, thus the pressure of oxygen may rise or fall. The pressure in the oxygen tank may therefore be used to determine the state of charge of the system. Alternately, for systems requiring a large change in state of charge, a pressure equalisation device may be provided to prevent over and/or under pressure in the oxygen tank. Moreover, the oxygen within the oxygen tank 10 can be implemented, for example as a solid oxygen source or as a molten oxygen source.

In contrast, the other tank 5 will contain a varying mixture of hydrogen and steam, depending on the state of charge of the system. Discharging the cell increases the concentration of steam and decreases the concentration of hydrogen, with the reverse occurring on recharge. As the reaction uses/generates products/reactants in a 1:1 ratio, there is little change of pressure in this tank 5. The dominant mixing effect is from the convection of gas from the very hot region adjacent to the cells to the relatively cooler area of the rest of the container. The heat regulation and insulating elements around the cells may be shaped to aid this convection process by allowing hot gas to expand over the top of the elements, sucking in cooler gas from the bottom. This would refresh the supply of active material and also mix the contents of the tank 5 as a whole. Further transport of active species will occur as a result of the concentration gradient that builds up due to the depletion of reactant at the electrode.

In use, the system may be switched from charge to discharge simply by electrical switching between applying and drawing a current. The arrangement, mode of operation and choice of materials of the apparatus described reduces the electrical energy required for electrolysis mode, reduces electrode over potentials and does not exhibit a voltage step on going from electrolysis to fuel cell mode at low currents. This allows for very rapid switching between modes of operation. The system is less sensitive to self-discharge effects and concentration of active species than presently commercialised flow cell systems. It also allows heat to be generated, which may be used, for example in domestic heating, hot water provision or utilised to drive a turbine to provide a secondary electricity source.

Figure 5:
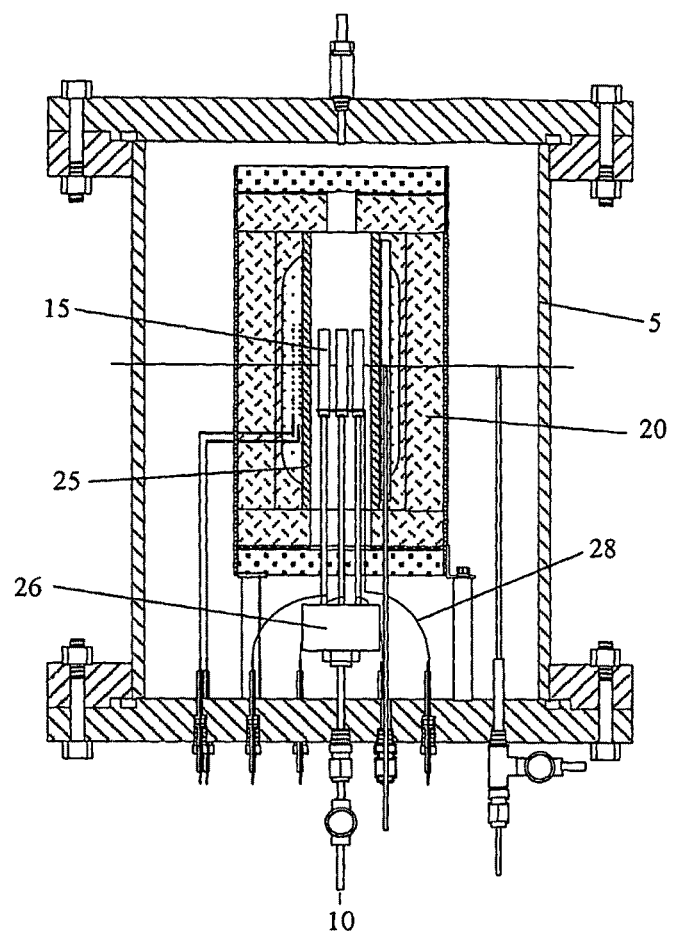
FIG. 5 is a schematic of a fuel cell that was used for experimental purposes.

FIG. 5 shows a specific example of a reversible heat and electricity storage device. This has a small cylindrical pressure vessel of 30 cm height and 20 cm diameter acting as the hydrogen/steam tank 5 and sealed with a Wills ring. Various ports and taps are provided for filling the tank 5 and routing cabling. The tank 5 is rated at 10 Bar at 300° C. Fuel cells 15 are located inside the tank 5, and linked via a manifold 26 to an external oxygen reservoir 10 (not shown). The fuel cells are tubular with a Ni/YSZ hydrogen facing electrode, YSZ electrolyte and LSM/YSZ oxygen facing electrode. The tubular cells are sealed with a YSZ seal at one end. An electrical furnace 25 is mounted into the pressure vessel. Two thermocouples are also provided to monitor both the furnace and hydrogen temperature.

Before use, a small beaker of water is placed in the tank 5, near the heating element 25 in order to provide an initial steam supply. The tank 5 is then pressurised with hydrogen and sealed. The pressure in the oxygen tank 10 is adjusted to be initially within 0.1 bar of that of the hydrogen tank 5 when heated. The hydrogen tank 5 is then heated to operating temperature, typically about 800-100° C. As the oxygen tank 10 in this example is remote and not thermally linked to the hot hydrogen tank, a larger volume of oxygen than hydrogen is provided in order to compensate for the thermal expansion pressure of the hot hydrogen tank 5. This further minimises the variation in oxygen pressure with variation in state of charge. If both tanks 5, 10 held the same volume, the pressure of the oxygen tank 10 would change half as fast as that of the hydrogen tank 5, as two moles of hydrogen or steam are used for each mole of oxygen. Once at temperature, the cells can be cycled without loss of pressure or cell performance. During operation, the cells achieved an open circuit voltage (OCV) of 1V. This volume of hydrogen offers a capacity of 140 A·hrs, which equates to a power capacity of approximately 100 W·hrs at 0.7V.

Figure 6:
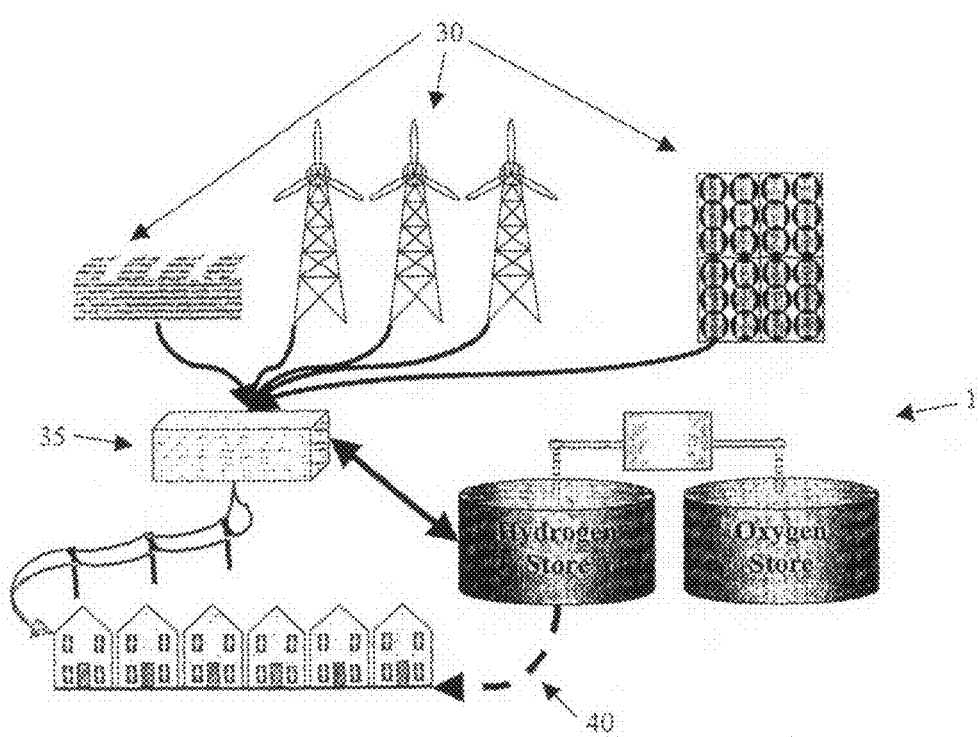
FIG. 6 is a schematic of the use of a reversible fuel cell in a renewable energy application.

FIG. 6 shows a closed and passive system that uses the present invention to provide a continuous supply to an electricity grid from renewable energy sources. Electricity is supplied to the storage apparatus 1 or an array of such apparatus by generators powered by renewable energy collectors 30, e.g. wind turbines or photovoltaic arrays. To allow power to be supplied from the apparatus 1 to the grid, a DC to AC converter (not shown) is provided. An electrical controller 35 is provided to monitor the power generated by the generators 27. The controller 35 may divert current from the generators to the energy storage apparatus 1 in order to maintain the apparatus 1 in a charged condition or cut the supply of power and draw additional current from the energy storage apparatus 1 to keep the total output reaching the grid constant. Another mode of operation is arbitrage, where the electricity storage device is slowly cycled between two relatively charged states in order to maintain the heat in the system, whilst keeping a useable level of charge in the cell. Hot water 40 may be extracted from the system via the heat regulator 25 and utilised to provide heating or residential hot water.

In the system of FIG. 6, the energy storage device 1 or array of such devices may have external tanks 5, 10 for storing hydrogen/steam and oxygen respectively. Using external tanks 5, 10 allows the separation of power and energy capacity of the system. The energy stored will depend on the amount of active material stored in the system, i.e. the capacity of the tanks. Thus the energy capacity may be increased or decreased by adding or removing further tanks 5, 10. In contrast, the amount of power that the system generates depends only on the total surface area and number of fuel cells 15. Thus, the power obtainable from the system is variable by adding or removing cells 15 or further storage apparatus 1.

The reversible hydrogen/oxygen fuel cell system in which the invention is embodied has many advantages. For example, it is fully scalable. This is because its capacity is only dependent on the gas storage pressure and volume, and so is easily extendable whilst the maximum power output is set by the effective electrode area and hence number of the fuel cells. By using solid oxide fuel cells and electrolysers, which run at high temperature, the waste heat produced by the cells is then available for local heating or co-generation systems, increasing the efficiency of the system. Hence, the invention is suitable for a wide range of applications including UPS, residential power back-up, heating and hot water provision (combined heat and power (CHP) systems) or protection of electrical islands on the grid.

A skilled person will appreciate that variations of the disclosed arrangements are possible without departing from the invention. For example, whilst the system shown in FIG. 1 has both fuel storage tanks 5, 10 abutting each other, it will be appreciated that both tanks may be remote from each other or one tank my be located inside the other. Also, whilst in the above examples, storage tanks for each reactant are generally used, in practice multiple tanks for each reactant or one of the reactants may be used. Similarly, multiple fuel cells 15 may be supplied by a varying number of storage tanks 5, 10. Furthermore, although this system is particularly suited for use with hydrogen/oxygen fuel cells, in practice, it may be adapted to many fuel cell chemistries in ways known in the art, such as by selection of appropriate electrode/electrolyte materials. In addition, although the fuel cells are herein described as advantageously solid oxide fuel cells, the system may be used with other fuel cell types. The fuel cells may be produced by any means known in the art and not confined only to those produced by tape casting. Also, although the system is operable in a substantially closed configuration, optionally one or more of the tanks may be adapted so that it can be refilled or topped up.

Figure 7:
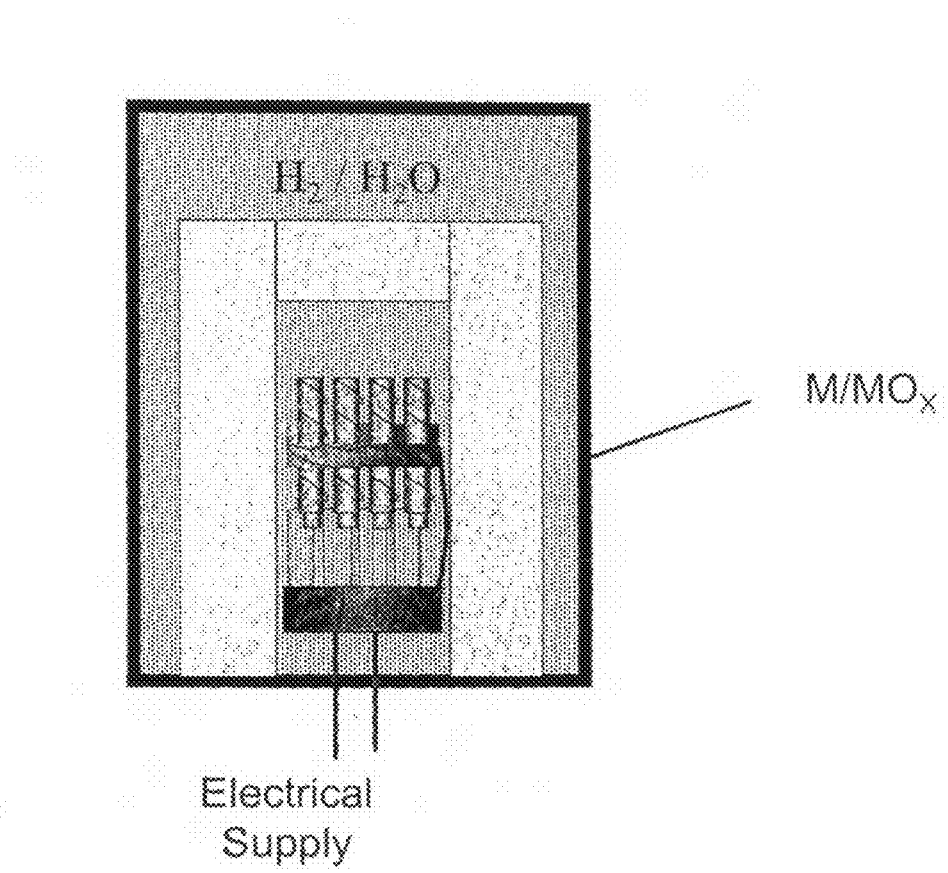
FIG. 7 is a schematic diagram of another reversible fuel cell.

In a further variation, the high-pressure oxygen vessel could be replaced with a molten metal/metal oxide oxygen store, as shown in FIG. 7. This offers some advantages and avoids the needs for matching pressure between the oxygen and hydrogen compartments and gas tight sealing. The volumetric energy storage density of a metal/metal oxide system based upon Pb, Sn, Zn, Sb etc is equivalent to 100 bars of oxygen pressure. This can be achieved by filling the SOFC tube with metal/metal oxide under a tight fitting YSZ disc with steel current collector. Accordingly the above description of the specific embodiment is made by way of example only and not for the purposes of limitation. It will be clear to the skilled person that minor modifications may be made without significant changes to the operation described.

The invention claimed is:

1. A heat and electricity storage system comprising a reversible solid oxide fuel cell having a first electrode and a second electrode separated by an ionically conducting electrolyte, at least two chambers adapted to hold reactant and/or a reaction product, and a heat regulator containing a heating element to provide heat and a cooling circuit to circulate heat, wherein the system is substantially closed such that the fuel cell is configured to generate heat as a product of the reaction in response to an initial provision of heat and steam, and the system is configured to operate without active supply of fresh reactants or removal of reaction products from the system such that the cooling circuit of the heating regulator is configured to circulate the heat generated as a product of the reaction by the fuel cell in order to provide a portion of the heat (i) to the solid oxide fuel cell to facilitate achievement and maintenance of an optimum operating temperature and (ii) to maintain water within the heat and electricity storage system in a gaseous state.

2. A system as claimed in claim 1, wherein the fuel and reaction product within each chamber is in fluid communication with the fuel cell.

3. A system as claimed in claim 1, wherein the cell is tubular.

4. A system as claimed in claim 1, wherein the electrolyte is yttrium stabilized zirconia.

5. A system as claimed in claim 1, wherein the cell is produced using a tape casting method.

6. A system as claimed in claim 1 having a cooling system for removing heat from the system.

7. An electricity storage system as claimed in claim 1, wherein one of the chambers is mounted within the other chamber.

8. An electricity storage system as claimed in claim 1, wherein at least one of the chambers is remote from the cell.

9. An electricity storage system as claimed in claim 1 wherein one fuel is a molten or solid oxygen source.

10. An electricity storage system as claimed in claim 9 wherein the molten or solid oxygen source contains an oxide of Zinc, Lead, Tin or Antimony.

11. An electricity grid having at least one electricity storage system as claimed in claim 1, control means and at least one electricity generation means.

12. An electricity grid supply system as claimed in claim 11, wherein the control means control supply of at least part of the electricity generated by the electricity generation means to the electricity storage system(s) or draw electricity from the electricity storage system(s).

13. A system as claimed in claim 1, wherein at least two of the chambers are separated by at least one reversible fuel cell.

14. A system as claimed in claim 1, wherein the fuel cell is provided within a chamber.

15. A system as claimed in claim 1, wherein at least one chamber abuts at least one other chamber.

16. A system as claimed in claim 1, wherein at least one reactant for discharge is hydrogen or oxygen.

17. A system as claimed in claim 1, wherein the fuel cells are surrounded by insulating material.

18. A system as claimed in claim 1, wherein the system is configured to maintain an operating temperature that is between about 800 and about 1000° C.

19. A system as claimed in claim 1, wherein the fuel cells are contained within the hydrogen tank.

20. A system as claimed in claim 7, wherein the hydrogen tank is contained within the oxygen tank.

21. A system as claimed in claim 19, wherein the system further comprises insulating elements around the cells, wherein the heat regulator and the insulating elements are shaped to promote convection of gas from a very hot region adjacent to the cells to a relatively cooler area of the rest of the hydrogen tank.

22. A heat and electricity storage system comprising a reversible solid fuel cell, the reversible solid fuel cell comprising:
 a heat regulator containing a heating element to provide heat and a cooling circuit to circulate heat; and
 a tubular cell comprising:
  a central cavity configured to hold reactant and/or reaction product;
  a first electrode of the reversible solid fuel cell comprising a first layer of electrode material arranged to face and circumscribe the central cavity;
  an electrolyte of the reversible solid fuel comprising a layer of electrolyte material arranged to circumscribe the first electrode;
  a second electrode of the reversible solid fuel cell comprising a second layer of electrode material arranged to circumscribe the electrolyte layer and to face an outside of the reversible solid fuel cell; and
  a helical shaped wire wrapped around the second electrode;
 wherein the tubular cell is sealed on opposing ends, the fuel cell configured to generate heat as a product of the reaction in response to an initial provision of heat and steam, and the electricity storage system is substantially closed such that the system is configured to operate without actively supplying fresh reactants or removing reaction product from the system such that the cooling circuit of the heating regulator is configured to circulate the heat generated as a product of the reaction by the fuel cell in order to provide a portion of the heat (i) to the solid oxide fuel cell to facilitate achievement and maintenance of an optimum operating temperature and (ii) to maintain water within the heat and electricity storage system in a gaseous state.

* * * * *